US012803056B2

(12) United States Patent
Niu et al.

(10) Patent No.: US 12,803,056 B2
(45) Date of Patent: Nov. 17, 2026

(54) SECONDARY BATTERY AND ELECTRIC DEVICE

(71) Applicant: CONTEMPORARY AMPEREX TECHNOLOGY CO., LIMITED, Ningde (CN)

(72) Inventors: Congsu Niu, Ningde (CN); Zhenxing Pei, Ningde (CN); Xiaowei Li, Ningde (CN); Limei Yang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/302,993

(22) Filed: Aug. 18, 2025

(65) Prior Publication Data

US 2025/0385317 A1 Dec. 18, 2025

Related U.S. Application Data

(63) Continuation of application No. PCT/CN2024/101490, filed on Jun. 26, 2024.

(30) Foreign Application Priority Data

Jun. 30, 2023 (CN) ......................... 202310797988.8

(51) Int. Cl.
*H01M 10/0569* (2010.01)
*H01M 4/02* (2006.01)
(Continued)

(52) U.S. Cl.
CPC ....... *H01M 10/0569* (2013.01); *H01M 4/133* (2013.01); *H01M 4/136* (2013.01);
(Continued)

(58) Field of Classification Search
CPC ......... H01M 10/0569; H01M 10/0525; H01M 4/133; H01M 4/136; H01M 2004/021;
(Continued)

(56) References Cited

U.S. PATENT DOCUMENTS

2014/0255796 A1* 9/2014 Matsuoka ............. H01M 4/139 429/188
2017/0214098 A1 7/2017 Sawai et al.
(Continued)

FOREIGN PATENT DOCUMENTS

CN 109786724 A 5/2019
CN 109860604 A 6/2019
(Continued)

OTHER PUBLICATIONS

The World Intellectual Property Organization (WIPO) International Search Report and Written Opinion for PCT/CN2023/135395 Mar. 4, 2024 13 Pages (including translation).
(Continued)

*Primary Examiner* — Matthew W Van Oudenaren
(74) *Attorney, Agent, or Firm* — ANOVA LAW GROUP, PLLC

(57) ABSTRACT

A secondary battery and an electric device. The secondary battery includes a negative electrode sheet and an electrolyte, where the negative electrode sheet includes a negative electrode current collector and a negative electrode active layer located on at least one surface of the negative electrode current collector, the negative electrode active layer includes graphite, and the areal density of the negative electrode active layer is 0.09 $mg/mm^2$ to 0.16 $mg/mm^2$; the lithium ion conductivity of the electrolyte at 25 °C is 10 mS/cm to 20 mS/cm; and the electrolyte includes a first solvent, the first solvent having a general structural formula of R1-COO—
(Continued)

R2, where R1 and R2 are each independently selected from any one of C1-C5 alkyl and C1-C5 haloalkyl.

12 Claims, 2 Drawing Sheets

(51) Int. Cl.

| | |
|---|---|
| ***H01M 4/133*** | (2010.01) |
| ***H01M 4/136*** | (2010.01) |
| ***H01M 10/0525*** | (2010.01) |

(52) U.S. Cl.
CPC .. *H01M 10/0525* (2013.01); *H01M 2004/021* (2013.01); *H01M 2004/027* (2013.01); *H01M 2004/028* (2013.01); *H01M 2220/20* (2013.01)

(58) Field of Classification Search
CPC ..... H01M 2004/027; H01M 2004/028; H01M 2220/20; H01M 10/0567
See application file for complete search history.

(56) References Cited

U.S. PATENT DOCUMENTS

| | | | | |
|---|---|---|---|---|
| 2020/0014061 | A1* | 1/2020 | Wang | H01M 10/0525 |
| 2021/0119258 | A1* | 4/2021 | Zou | H01M 4/525 |
| 2021/0408595 | A1* | 12/2021 | Tang | C07D 327/00 |
| 2021/0408601 | A1* | 12/2021 | Tang | C07D 319/12 |
| 2022/0123366 | A1* | 4/2022 | Jiang | H01M 10/0567 |
| 2023/0117520 | A1 | 4/2023 | Huang et al. | |

FOREIGN PATENT DOCUMENTS

| | | | |
|---|---|---|---|
| CN | 113745639 | A | 12/2021 |
| CN | 112768769 | * | 5/2022 |
| CN | 115275181 | A | 11/2022 |
| CN | 115275319 | A | 11/2022 |
| CN | 115810718 | A | 3/2023 |
| CN | 115832184 | A | 3/2023 |
| CN | 115832444 | A | 3/2023 |
| CN | 115917825 | A | 4/2023 |
| CN | 116315038 | A | 6/2023 |
| CN | 116315090 | A | 6/2023 |
| CN | 116759646 | A | 9/2023 |
| EP | 3641025 | A1 | 4/2020 |
| JP | 2004095203 | A | 3/2004 |
| WO | 2023004819 | A1 | 2/2023 |
| WO | 2023045948 | A1 | 3/2023 |
| WO | WO2023045948 | * | 3/2023 |

OTHER PUBLICATIONS

The World Intellectual Property Organization (WIPO) International Search Report and Written Opinion for PCT/CN2024/101490 Sep. 12, 2024 18 Pages (including translation).

China National Intellectual Property Administration (CNIPA) First Office Action for Application No. 202310797988.8 Apr. 18, 2024 9 Pages (including translation).

State Intellectual Property Office of China Notice of Grant of Invention Patent Right for Application No. 202310797988.8 Jul. 22, 2024 7 pages (including translation).

European Patent Office(EPO) Extended European Search Report for Application No. 24830787.8 Jun. 1, 2026 11 Pages.

* cited by examiner

SECONDARY BATTERY AND ELECTRIC DEVICE

CROSS-REFERENCE TO RELATED APPLICATION

This application is a continuation of International Application No. PCT/CN2024/101490, filed on Jun. 26, 2024, which claims priority to Chinese Application No. 202310797988.8, filed on Jun. 30, 2023, the entire contents of both of which are incorporated herein by reference.

TECHNICAL FIELD

The present application relates to the technical field of secondary batteries, and in particular, to a secondary battery and an electric device.

BACKGROUND

The statement here merely provides the background information related to the present application and does not necessarily constitute the prior art.

With the continuous increase in the popularity of secondary batteries, consumers have an increasingly higher demand for the performance of secondary batteries. The cycle performance and charging speed of the batteries have become the focus of attention.

SUMMARY

In order to achieve the above objective, the present application provides a secondary battery with better cycle performance.

The present application provides a secondary battery, including a negative electrode sheet and an electrolyte, where the negative electrode sheet includes a negative electrode current collector and a negative electrode active layer located on at least one surface of the negative electrode current collector, the negative electrode active layer includes graphite, and the areal density of the negative electrode active layer is 0.09 $mg/mm^2$ to 0.16 $mg/mm^2$; the lithium ion conductivity of the electrolyte at 25 °C is 10 mS/cm to 20 mS/cm; and the electrolyte includes a first solvent, the first solvent having a general structural formula of R1-COO—R2, where R1 and R2 are each independently selected from any one of C1-C5 alkyl and C1-C5 haloalkyl.

The present application provides a secondary battery, including a negative electrode sheet and an electrolyte, where the negative electrode sheet includes a negative electrode current collector and a negative electrode active layer located on at least one surface of the negative electrode current collector, the negative electrode active layer includes graphite, and the areal density of the negative electrode active layer is less than or equal to 0.16 $mg/mm^2$; and the lithium ion conductivity of the electrolyte is less than or equal to 20 mS/cm.

The above-mentioned secondary battery can achieve both good cycle performance and good fast-charging performance by appropriately combining the negative electrode sheet and the electrolyte.

In some embodiments, the lithium ion conductivity of the electrolyte is 12 mS/cm to 20 mS/cm.

In some embodiments, the lithium ion conductivity of the electrolyte is 15 mS/cm to 20 mS/cm.

In some embodiments, the areal density of the negative electrode active layer is 0.12 $mg/mm^2$ to 0.16 $mg/mm^2$.

In some embodiments, the first solvent includes at least one of the following compounds:

(1)

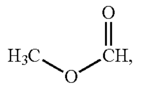

(2)

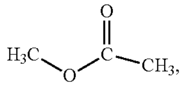

(3)

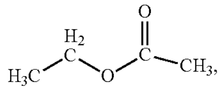

(4)

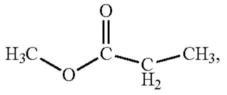

(5)

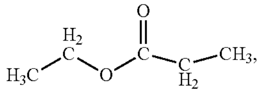

(6)

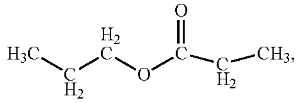

(7)

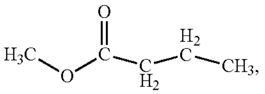

(8)

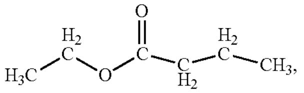

(9)

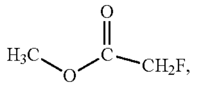

(10)

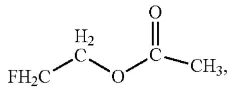

(11)

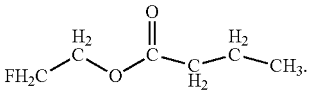

In some embodiments, the mass percentage of the first solvent in the electrolyte is 5% to 55%, optionally 10% to 55%, more optionally 25% to 55%.

In some embodiments, the electrolyte further includes an additive, at least a part of which reacts prior to the first solvent at the time of forming a solid electrolyte interface (SEI) film.

In some embodiments, the additive satisfies at least one of the following features:

(1) a reduction potential of the additive with respect to $Li/Li^+$ is 0.9 V to 1.7 V;

(2) the additive comprises one or more of vinylene carbonate, fluoroethylene carbonate, vinylethylene carbonate, vinyl sulfate, vinyl sulfite, 1,3-propane sultone, and 1,3-propene sultone; and (3) the mass percentage of the additive in the electrolyte is 2% to 10%, optionally 3% to 8%.

In some embodiments, the mass d1 of the first solvent and the mass d2 of the additive satisfy: $0.05 \leq d2/d1 \leq 1$, optionally $0.05 \leq d2/d1 \leq 0.6$, optionally $0.05 \leq d2/d1 \leq 0.4$.

In some embodiments, the mass d1 of the first solvent, the mass d2 of the additive, and a rated capacity A of the secondary battery satisfy: 0.1 g/Ah≤(d1+d2)/A≤2.3 g/Ah, optionally 0.5 g/Ah≤(d1+d2)/A≤2.2 g/Ah.

In some embodiments, the graphite is artificial graphite, and the secondary battery satisfies: $0.05 \leq d2/d1 \leq 0.5$, optionally $0.05 \leq d2/d1 \leq 0.35$; and/or 0.4 g/Ah≤(d1+d2)/A≤2.3 g/Ah, optionally 0.7 g/Ah≤(d1+d2)/A≤2.0 g/Ah.

In some embodiments, the graphite comprises natural graphite, and the secondary battery satisfies: $0.1 \leq d2/d1 \leq 1$, optionally $0.1 \leq d2/d1 \leq 0.35$; and/or 0.1 g/Ah≤(d1+d2)/A≤1.5 g/Ah, optionally 0.5 g/Ah≤(d1+d2)/A≤1.5 g/Ah.

In some embodiments, the secondary battery satisfies at least one of the following conditions: a porosity P of the negative electrode active layer satisfies 20%≤P≤50%, further optionally 25%≤P≤40%; and a compacted density Cd of the negative electrode active layer satisfies Cd≥1.5 g/$cm^3$, further optionally 1.5 g/$cm^3$≤Cd≤1.8 g/$cm^3$.

In some embodiments, the electrolyte includes a second solvent including at least one of cyclic carbonate and linear carbonate; and optionally, the mass percentage of the second solvent in the electrolyte is 30% to 85%.

In some embodiments, the secondary battery satisfies: d3/A≤3.5 g/Ah, where d3 represents the mass of the electrolyte in g, A represents the rated capacity of the secondary battery in Ah, and optionally, 2 g/Ah≤d3/A≤3.3 g/Ah.

In some embodiments, the secondary battery satisfies: $0.8 \leq (d2/d1)/(CW \times P/Cd) \leq 230$, where d1 represents the mass of the first solvent in g, d2 represents the mass of the additive in g, CW represents the areal density of the negative electrode active layer in mg/$mm^2$, P represents the porosity of the negative electrode active layer, and Cd represents the compacted density of the negative electrode active layer in g/$cm^3$.

In some embodiments, the secondary battery further includes a positive electrode sheet including a positive electrode current collector and a positive electrode active layer located on at least one surface of the positive electrode current collector, the positive electrode active layer including olivine-structured lithium-containing phosphate.

In some embodiments, the olivine-structured lithium-containing phosphate has a chemical formula of $LiFe_{1-x-y}Mn_xM_yPO_4$, where $0 \leq x \leq 1$, $0 \leq y < 1$, and M is selected from one or more of V, Nb, Ti, Co, Ni, Sc, Ge, Mg, Al, Zr, Mn, Hf, Ta, Mo, W, Ru, Ag, Sn, and Pb.

The present application further provides an electric device including the above-mentioned secondary battery.

DESCRIPTION OF DRAWINGS

In order to describe the technical solutions of the present application more clearly, the accompanying drawings used in the present application will be briefly described below. It is clear that the accompanying drawings described below show only some embodiments of the present application, and a person of ordinary skill in the art may further derive other accompanying drawings from the accompanying drawings without creative efforts.

DESCRIPTION OF REFERENCE SIGNS

Figure 1:
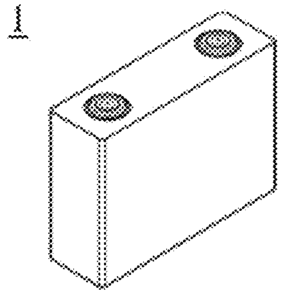
FIG. 1 is a schematic diagram of a secondary battery according to an embodiment of the present application.

1—secondary battery; 11—housing; 12—electrode assembly; 13—cover plate; and 2—electric device.

In order to better describe and illustrate embodiments and/or examples disclosed herein, reference may be made to one or a plurality of accompanying drawings. Additional details or examples used to describe the accompanying drawings should not be considered as limiting the scope of the disclosure, the currently described embodiments and/or examples, and best modes as currently understood.

DESCRIPTION OF EMBODIMENTS

In order to facilitate the understanding of the present application, the present application will be described more fully below with reference to the relevant drawings. Some embodiments of the present application are given in the drawings. However, the present application can be implemented in many different forms and is not limited to the embodiments described herein. On the contrary, the purpose of providing these embodiments is to make the understanding of the disclosed content of the present application more thorough and comprehensive.

Unless otherwise defined, all technical and scientific terms used herein have the same meaning as commonly understood by a person skilled in the art to which the present application belongs. The terms used in the specification of the present application herein are merely for the purpose of describing specific embodiments and are not intended to limit the present application. The term "and/or" used herein includes any and all combinations of one or more of the associated listed items.

The "range" disclosed in this application is limited in the form of a lower limit and an upper limit. A given range is limited by selecting a lower limit and an upper limit, which define the boundaries of the specific range. A range defined in this manner may include an end value or may not include an end value, and may be any combination, that is, any lower limit may be combined with any upper limit to form a range. For example, if ranges of 60-120 and 80-110 are listed for specific parameters, it is understood that the ranges of 60-110 and 80-120 are also expected. Furthermore, if the smallest values 1 and 2 of a range are listed, and if the largest values 3, 4 and 5 of the range are listed, the following ranges are all expected: 1-3, 1-4, 1-5, 2-3, 2-4, and 2-5. In this application, unless otherwise stated, a numerical range "a-b" represents a shorthand representation for a combination of any real numbers between a and b, where both a and b are real numbers. For example, a numerical range of "0-5" represents that all real numbers in the range of "0-5" have been listed herein, and "0-5" is merely a shorthand representation of combinations of these numerical values. In addition, when a parameter is expressed as an integer ≥2, it is equivalent to disclosing that the parameter is an integer such as 2, 3, 4, 5, 6, 7, 8, 9, 10, 11, or 12.

Unless otherwise specified, all embodiments and optional embodiments of this application may be combined with each other to form new technical solutions.

Unless otherwise specified, all technical features and optional technical features of this application can be combined with each other to form new technical solutions.

Unless otherwise specified, all steps in this application may be performed sequentially or randomly, in some embodiments sequentially. For example, the method includes steps (a) and (b), which indicates that the method may include sequentially performed steps (a) and (b) or may include sequentially performed steps (b) and (a). For example, the mentioned method may further include step (c), which indicates that step (c) may be added to the method in any order, for example, the method may include steps (a), (b), and (c), may include steps (a), (c), and (b), may include steps (c), (a) and (b), or the like.

Unless otherwise specified, the terms “including” and “containing” as mentioned in this application are meant to be open-ended. For example, the “including” and “containing” may mean that other components not listed may or may not be further included or contained.

In this application, the term “or” is inclusive, unless specifically stated otherwise. For example, the phrase “A or B” means “A, B, or both A and B”. More specifically, the condition “A or B” is satisfied by any one of the following: A is true or exists and B is false or does not exist, A is false or does not exist and B is true or exists, or both A and B are true, or both A and B exist. In this disclosure, unless otherwise specified, phrases like “at least one of A, B, and C” and “at least one of A, B, or C” both mean only A, only B, only C, or any combination of A, B, and C.

Unless otherwise specified, the terms used in the present application have the meanings commonly understood by those skilled in the art. Unless otherwise specified, the numerical values of each parameter mentioned in the present application may be measured by various measuring methods commonly used in the art. For example, the test may be performed according to the methods given in the examples of the present application.

An embodiment of the present application provides a secondary battery, including a negative electrode sheet and an electrolyte. The negative electrode sheet includes a negative electrode current collector and a negative electrode active layer located on at least one surface of the negative electrode current collector. The negative electrode active layer includes graphite, and the areal density of the negative electrode active layer is less than or equal to 0.16 $mg/mm^2$. The lithium ion conductivity of the electrolyte is less than or equal to 20 mS/cm. For example, the areal density is 0.09 $mg/mm^2$ to 0.16 $mg/mm^2$, and the lithium ion conductivity of the electrolyte at 25 °C is 10 mS/cm to 20 mS/cm. The first solvent has a general structural formula of R1-COO—R2, where R1 and R2 are each independently selected from any one of C1-C5 alkyl and C1-C5 haloalkyl. This secondary battery can have high energy density and achieve both good cycle performance and good fast-charging performance by appropriately combining the negative electrode sheet and the electrolyte.

Increasing the areal density of the electrode sheets in the secondary battery is advantageous for improving the energy density, but the increasing areal density may adversely affect the fast-charging performance of the battery. In addition, under the assumption that the compacted density is the same, the higher the areal density is, the larger the thickness of the active material layer of the electrode sheet is, so that the concentration polarization of lithium ions due to the liquid phase diffusion process of the electrolyte is also increased. Concentration polarization problems may lead to lithium precipitation on the surface of the negative electrode sheet, thereby affecting the fast-charging performance and the life of the battery. Therefore, the fast-charging performance of the battery can be improved by increasing the lithium ion conductivity of the electrolyte to enhance the liquid phase diffusion capability. The use of the compound having the structure of R1-COO—R2 can better improve the ion conductivity of the electrolyte. However, if the ion conductivity is excessively improved, the content of the R1-COO—R2 type compound in the electrolyte is significantly increased, leading to a large increase in the gas generation of the battery, which is disadvantageous for the cycle life of the battery. Therefore, the negative electrode sheet and the electrolyte are appropriately combined, the electrolyte including the first solvent is used, and the areal density of the electrode sheet and the lithium ion conductivity of the electrolyte are controlled within a certain range, so that it is possible to maintain high energy density and good fast-charging performance while achieving both safety and cycle performance.

It can be understood that, in a method for measuring the lithium ion conductivity, 100 ml of a sample is taken from a dry and clean corrosion-resistant sample bottle and hermetically placed in a constant-temperature water bath at 25 °C.±0.5 °C. When the temperature of the sample is constant, a commercially available multi-temperature-point conductivity analyzer is used, and a bottle cap of the sample bottle is replaced by a rubber stopper inserted with an electrode. When the temperature is within the range of 25 °C.±0.5 °C, data from the conductivity analyzer is read, which is the conductivity of the tested sample.

In some embodiments, the areal density of the negative electrode active layer is 0.09 $mg/mm^2$ to 0.16 $mg/mm^2$. Specifically, it may be 0.12 $mg/mm^2$ to 0.16 $mg/mm^2$. Optionally, the areal density of the negative electrode active layer is 0.1 $mg/mm^2$, 0.11 $mg/mm^2$, 0.12 $mg/mm^2$, 0.13 $mg/mm^2$, 0.14 $mg/mm^2$, 0.15 $mg/mm^2$, or the like.

In some embodiments, the lithium ion conductivity of the electrolyte is 10 mS/cm to 20 mS/cm. For example, it may be 12 mS/cm to 20 mS/cm or 15 mS/cm to 20 mS/cm. Optionally, the lithium ion conductivity of the electrolyte is 11 mS/cm, 12 mS/cm, 13 mS/cm, 14 mS/cm, 15 mS/cm, 16 mS/cm, 17 mS/cm, 18 mS/cm, 19 mS/cm, or the like. Too low lithium ion conductivity of the electrolyte may reduce the charging performance of the battery. Further optionally, the lithium ion conductivity of the electrolyte is 14 mS/cm to 20 mS/cm.

In some embodiments, the compacted density Cd of the negative electrode active layer may satisfy $Cd \geq 1.5$ $g/cm^3$, optionally 1.5 $g/cm^3 \leq Cd \leq 1.8$ $g/cm^3$. The compacted density of the negative electrode active layer within this range can maintain high energy density. Further optionally, the compacted density Cd of the negative electrode active layer is 1.5 $g/cm^3$, 1.6 $g/cm^3$, 1.7 $g/cm^3$, 1.8 $g/cm^3$, or the like.

In some embodiments, the porosity P of the negative electrode active layer may satisfy $P \leq 50\%$, optionally $20\% \leq P \leq 50\%$. Optionally, $25\% \leq P \leq 40\%$. The porosity of the negative electrode active layer within this range may provide a suitable transport path for lithium ions, which is advantageous in improving the transport efficiency of lithium ions, thereby improving the cycle performance of the secondary battery. Further optionally, the porosity P of the negative electrode active layer is 20%, 30%, 40%, 50%, or the like.

When the compacted density and/or the porosity of the negative electrode active layer satisfy the above requirements, the wetting rate of the electrolyte in the active layer can be increased while the energy density of the negative electrode sheet is ensured, which is advantageous for further improving the fast-charging performance of the secondary battery.

In some embodiments, the first solvent included in the electrolyte may function to increase the lithium ion conductivity of the electrolyte. In order to further improve the safety performance of the electrolyte, the reduction potential of the first solvent with respect to $Li/Li^+$ may be less than or equal to 1.3 V. During charging of the battery, a certain gas generation problem may occur when the solvent participates in the formation of the SEI film. The occurrence of the gas generation problem may adversely affect the cycle performance of the battery. In this embodiment, the reduction potential of the first solvent is small, the time at which the first solvent participates in the formation of the SEI film during charging can be delayed, the degree of gas generation of the battery can be reduced, and thus the cycle performance of the battery can be improved. Optionally, the reduction potential of the first solvent with respect to $Li/Li^+$ is less than or equal to 1.2 V. Further optionally, the reduction potential of the first solvent with respect to $Li/Li^+$ is less than or equal to 1.1 V. Still further optionally, the reduction potential of the first solvent relative to $Li/Li^+$ is less than or equal to 1 V.

In some embodiments, the first solvent has a general structural formula of R1-COO—R2, where R1 and R2 are each independently selected from any one of C1-C5 alkyl and C1-C5 haloalkyl. The introduction of the carboxylate-type first solvent in the electrolyte is advantageous for improving the energy density and the fast-charging performance of the battery. Optionally, R1 and R2 may be the same or different.

It can be understood that alkyl refers to saturated hydrocarbon containing a primary (positive) carbon atom, or a secondary carbon atom, or a tertiary carbon atom, or a quaternary carbon atom, or a combination thereof. A phrase containing the term, for example, "C1-C5 alkyl" means alkyl containing 1 to 5 carbon atoms, which, each time it appears, may independently be C1 alkyl, C2 alkyl, C3 alkyl, C4 alkyl, or C5 alkyl. Optionally, the alkyl may be linear alkyl or branched alkyl.

It may also be understood that the number of halogen atoms in the haloalkyl may be one or plural. When the haloalkyl has a plurality of halogen atoms, the halogen atoms may be the same or different.

In some embodiments, R1 and R2 are each independently selected from any one of methyl, ethyl, propyl, butyl, fluoromethyl, fluoroethyl, fluoropropyl, and fluorobutyl. At this time, the appropriate viscosity and lithium ion conductivity of the electrolyte can be maintained.

As some specific examples of the first solvent, the first solvent includes at least one of the following compounds:

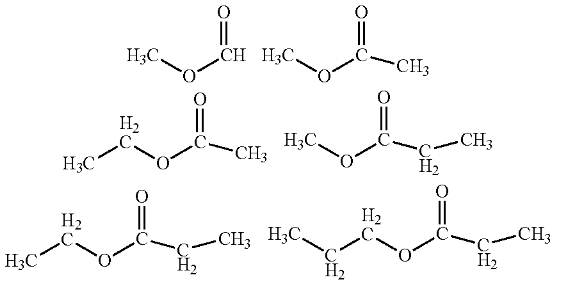

-continued

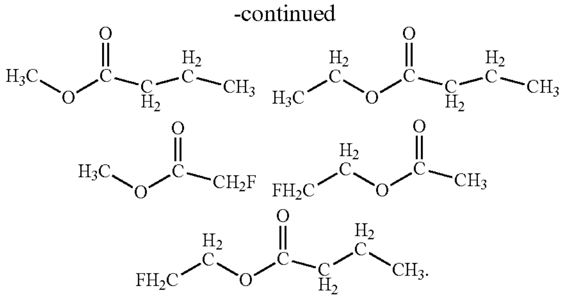

As some examples of the amount of the first solvent used, the first solvent accounts for 5% to 55% by mass of the electrolyte. More specifically, it may be 10% to 55%, more specifically 25% to 55%. When the first solvent accounts for an excessively small mass percentage of the electrolyte, the lithium ion conductivity of the electrolyte may be too small, thereby limiting the improvement of the fast-charging performance. When the first solvent accounts for an excessively large mass percentage of the electrolyte, the amount of generated gas may increase, thereby limiting the improvement of the cycle performance of the battery. Optionally, the mass percentage of the first solvent in the electrolyte is 5%, 10%, 15%, 20%, 25%, 30%, 35%, 40%, 45%, 50%, or 55%. Further optionally it is 10% to 50%.

In some embodiments, the content of the first solvent may be matched to the porosity and compacted density of the electrode sheet. Specifically, the wetting rate of the first solvent on the electrode sheet can be increased by adjusting the content of the first solvent and the porosity and/or the compacted density of the negative electrode sheet, so that the fast-charging performance of the secondary battery can be improved. In some embodiments, the mass percentage of the first solvent in the electrolyte is 5% to 55%, the areal density of the negative electrode active layer is 0.12 $mg/mm^2$ to 0.14 $mg/mm^2$, and the porosity of the negative electrode active layer is 20% to 40%. When the above parameters of the secondary battery satisfy the above ranges, the secondary battery may have good fast-charging performance, short fast-charging time, less gas generation, and high battery safety performance while maintaining good cycle performance.

In some embodiments, the electrolyte further includes an additive. At the time of forming the SEI film, at least a part of the additive may react prior to the first solvent. The additive with the above performance can react prior to the first solvent during operation of the secondary battery, for example, at the time of forming the SEI film, so that the time for the first solvent to participate in reaction decomposition can be delayed, and the amount of gas generated from the first solvent due to the reaction decomposition can be reduced. Thus, the secondary battery to which the additive is added may have better cycle performance.

In some embodiments, the reduction potential of the additive is greater than the reduction potential of the first solvent. Specifically, the reduction potential of the additive with respect to $Li/Li^+$ is greater than the reduction potential of the first solvent with respect to Li/Lit. When the reduction potential of the additive is greater than the reduction potential of the first solvent, the additive may preferentially participate in the formation of the SEI film during charging, further delaying the time at which the first solvent participates in the formation of the SEI film during charging, which is advantageous in further improving the gas generation problem of the battery, thereby improving the cycle performance of the battery. In addition, the SEI formed with the participation of the first solvent has poor performance. In this embodiment, the additive preferentially participates in the formation of the SEI film, so that the performance of the SEI film can be enhanced and the cycle performance of the battery can be further improved.

Optionally, the reduction potential of the additive with respect to $Li/Li^+$ is 0.9 V to 1.7 V. Further optionally, the reduction potential of the additive with respect to $Li/Li^+$ is 0.9 V, 1 V, 1.1 V, 1.2 V, 1.3 V, 1.4 V, 1.5 V, 1.6 V, 1.7 V, or the like. As some optional examples of the additive, the additive includes one or more of vinylene carbonate, fluoroethylene carbonate, vinylethylene carbonate, vinyl sulfate, vinyl sulfite, and 1,3-propane sultone.

As some examples of the amount of the additive, the additive accounts for 2% to 10% by mass of the electrolyte. When the mass percentage of the additive in the electrolyte is too small, the effect of improving the gas generation in the battery is not satisfactory. When the mass percentage of the additive in the electrolyte is too large, the amount of the first solvent used may be correspondingly reduced, which may lower the kinetic performance of the electrolyte, for example, lower the lithium ion conductivity of the electrolyte, thereby limiting the improvement of the fast-charging performance of the battery. Optionally, the mass percentage of the additive in the electrolyte is 2%, 3%, 4%, 5%, 6%, 7%, 8%, 9%, or 10%. Further optionally, the mass percentage of the additive in the electrolyte is 3% to 8%.

Since the additive proposed in the present application can form the SEI film prior to the first solvent, the wetting rate of the electrolyte, particularly the additive, on the surface of the electrode sheet can be improved by adjusting the content of the additive and the parameters such as the porosity and compacted density of the electrode sheet. Specifically, there may be a concentration gradient of the additive inside and outside the electrode sheet, so selecting appropriate type and content of the additive, porosity of the electrode sheet and compacted density of the electrode sheet may make the wetting of the additive in the thickly coated electrode sheet faster, be more favorable for the film formation inside the electrode sheet, and lower the gas generation.

In some embodiments, the content of the additive and the content of the first solvent may also be matched to each other. For example, the content of the additive may be made to increase as the content of the carboxylate as the first solvent increases. Since the first solvent such as carboxylate is less compatible with the negative electrode and generates gas more easily, the additive can be added more when the content of the first solvent in the electrolyte is increased, thereby improving the effect of reducing gas generation by maintaining the interface performance of the additive. The total amount of the first solvent and the additive may be controlled to better balance the fast-charging performance and the safety performance of the secondary battery, so that the fast charging can be realized while controlling the amount of generated gas, thereby improving the safety of the battery. Specifically, when the total injection amount of the first solvent and the additive is small, the fast-charging performance of the secondary battery is easily affected. When the total injection amount of the first solvent and the additive is large, gas generation increases, and the life and safety of the secondary battery are deteriorated. In some embodiments, the mass d1 (in g) of the first solvent and the mass d2 (in g) of the additive may satisfy: $0.05 \leq d2/d1 \leq 1$. When the content of the first solvent and the content of the additive satisfy the above requirements, the secondary battery may have both good fast-charging performance and good safety performance. In this case, the ratio between the amount of the additive used and the amount of the first solvent used is appropriate, so that the effects of the additive and the first solvent can be more fully exhibited. For example, when the amount of the additive used and the amount of the first solvent used satisfy this condition, the SEI film with good performance can be formed, and at the same time, the improvement of the ion conductivity of the electrolyte can be promoted, so that the battery can maintain good fast-charging performance, and the gas generation can be effectively reduced, thereby further improving the cycle performance of the battery. Optionally, $0.05 \leq d2/d1 \leq 0.6$. Optionally, $0.05 \leq d2/d1 \leq 0.4$. Optionally, d2/d1 may be 0.05, 0.06, 0.07, 0.08, 0.09, or 0.1.

In some embodiments, the rated capacity A (in Ah) of the secondary battery, the mass d1 (in g) of the first solvent, and the mass d2 (in g) of the additive may satisfy the following condition: $0.1\ g/Ah \leq (d1+d2)/A \leq 2.3\ g/Ah$. Optionally, $0.5\ g/Ah \leq (d1+d2)/A \leq 2.2\ g/Ah$. When the content of the first solvent, the content of the additive, and the rated capacity A of the secondary battery satisfy the above requirements, a good balance between the fast-charging performance and the cycle performance may be maintained, and while the lithium ion conductivity of the electrolyte may be increased to improve the fast-charging performance, the gas generation problem due to decomposition of the component in the electrolyte, particularly the first solvent, may be controlled, so that the secondary battery may be maintained to have long cycle life and good safety performance. In general, when the secondary battery satisfies the above conditions, the secondary battery may have better electrode sheet-electrolyte interface performance, the electrolyte may wet the electrodes at a faster rate, and the electrolyte may maintain better kinetic performance, so that the secondary battery may have better overall performance.

In the present application, the rated capacity of the secondary battery may be determined using a conventional technical means in the art. For example, the discharge capacity is the rated capacity when the battery is charged to 3.65 V at a charging rate of 0.33 C for the nominal capacity of the battery, then charged to 0.05 C at a constant voltage of 3.65 V, left to stand for 10 min, and then discharged to 2.0 V at a discharging rate of 0.33 C. The nominal capacity is usually labeled in the electric device.

In some embodiments, the content of the first solvent and the content of the additive may also be adjusted according to the composition of the negative electrode. For example, the graphite may include artificial graphite and not contain natural graphite, specifically, the graphite is artificial graphite. In this case, $0.05 \leq d2/d1 \leq 0.5$, optionally $0.05 \leq d2/d1 \leq 0.35$. Further, $0.4\ g/Ah \leq (d1+d2)/A \leq 2.3\ g/Ah$, optionally $0.7\ g/Ah \leq (d1+d2)/A \leq 2.0\ g/Ah$. The artificial graphite has fewer surface defects, so in the case where the negative electrode does not contain natural graphite, the content of the first solvent in the electrolyte can be appropriately reduced, and the content of the additive can be adjusted accordingly.

In some embodiments, the graphite includes natural graphite. In this case, $0.1 \leq d2/d1 \leq 1$, optionally $0.1 \leq d2/d1 \leq 0.35$. Further, $0.1\ g/Ah \leq (d1+d2)/A \leq 1.5\ g/Ah$. Optionally $0.5\ g/Ah \leq (d1+d2)/A \leq 1.5\ g/Ah$. Since the natural graphite has relatively many surface defects, the content of the first solvent may be appropriately increased to compensate for the consumption of the first solvent by the natural graphite. Similarly, the content of the additive may be adjusted accordingly at this time.

In some embodiments, the secondary battery satisfies: $0.8 \leq (d2/d1)/(CW \times P/Cd) \leq 230$, where d1 represents the mass of the first solvent in g, d2 represents the mass of the additive in g, CW represents the areal density of the negative electrode active layer in $mg/mm^2$, P represents the porosity of the negative electrode active layer, and Cd represents the compacted density of the negative electrode active layer in $g/cm^3$. During charging of the secondary battery, there is a certain concentration gradient of the first solvent and the additive in the thickness direction of the electrode sheet, and the closer to the negative electrode current collector is, the worse the quality of the SEI film formed is, the more likely the side reaction occurs to generate gas. When the secondary battery satisfies $0.8 \leq (d2/d1)/(CW \times P/Cd) \leq 230$, the concentration gradient can be well balanced, and the concentration homogeneity of the first solvent and the additive in the thickness direction of the electrode sheet can be improved, so that the gas generation can be reduced, further improving the cycle performance of the battery. Optionally, the secondary battery satisfies $0.8 \leq (d2/d1)/(CW \times P/Cd) \leq 30$.

It is to be noted that the porosity is usually expressed in the form of a percentage, for example, the porosity of the negative electrode active layer is 20%, 30%, 40%, 50%, or the like. For the calculation of $(d2/d1)/(CW \times P/Cd)$, the value of the porosity P is substituted. For example, when the porosity P of the negative electrode active layer is 50%, P=0.5 is substituted into $(d2/d1)/(CW \times P/Cd)$ for calculation. When the porosity P of the negative electrode active layer is 20%, P=0.2 is substituted into $(d2/d1)/(CW \times P/Cd)$ for calculation.

In some embodiments, the secondary battery may satisfy: the areal density of the negative electrode active layer is 0.12 $mg/mm^2$ to 0.14 $mg/mm^2$, the lithium ion conductivity of the electrolyte is 15 mS/cm to 19 mS/cm, the porosity of the negative electrode active layer is 20% to 40%, and the compacted density of the negative electrode active layer is 1.5 $g/cm^3$ to 1.8 $g/cm^3$. The electrolyte includes a first solvent including carboxylate and an additive including at least one of vinylene carbonate, 1,3-propene sultone, and fluoroethylene carbonate. The content of the first solvent in the electrolyte is 20% to 50%, and the content of the additive is 5% to 10%.

In some embodiments, the electrolyte includes a second solvent including at least one of cyclic carbonate and linear carbonate. Optionally, the second solvent accounts for 30% to 85% by mass of the electrolyte. Further optionally, the mass percentage of the second solvent in the electrolyte is 30%, 35%, 40%, 45%, 50%, 55%, 60%, 65%, 70%, 75%, 80%, or 85%.

In some embodiments, the secondary battery satisfies: $d3/A \leq 3.5$ g/Ah, where d3 represents the mass of the electrolyte in g, which may specifically be the total mass of the electrolyte including the lithium salt, the first and second solvents, and other solvents and additives, and A represents the rated capacity of the secondary battery in Ah. Optionally, d3/A may be 1 g/Ah, 1.2 g/Ah, 1.5 g/Ah, 1.8 g/Ah, 2 g/Ah, 2.2 g/Ah, 2.5 g/Ah, 2.8 g/Ah, 3 g/Ah, or 3.2 g/Ah. Further optionally, 2 g/Ah $\leq d3/A \leq$ 3.3 g/Ah. When the mass d3 of the electrolyte and the rated capacity A satisfy the above relationship, the secondary battery may have better performance.

It can be understood that the mass of the first solvent and the mass of the additive may be tested by the following method.

In S101, the battery is weighed, and the mass is denoted as M0.

In S102, the battery is disassembled, the free electrolyte is poured out, and the components of the free electrolyte to be tested are taken.

In S103, the inner battery cell is taken out, the positive electrode sheet, the negative electrode sheet, the separator, and the mechanical part are separated and are washed by immersion in the DMC solvent for 24-48 hours, and the immersion is repeated three or more times.

In S104, the positive electrode sheet, the negative electrode sheet, the separator, and the mechanical part are placed in an oven at 100 °C for 24 hours or more to be completely dried.

In S105, the dried positive electrode sheet, negative electrode sheet, separator and mechanical part are weighed, and the mass is denoted as M1.

In S106, the mass of the electrolyte in the battery is obtained, where d3=M0−M1.

In S107, the content of inorganic substances in the electrolyte is tested by using an ion chromatograph (IC), a certain amount of the electrolyte is weighed (the concentration of a diluted solution is in the middle of the standard curve), the volume is adjusted to 100 mL with ultrapure water, ion chromatography auto-sampling detection is performed, ion chromatograms for the inorganic substances are tested, the corresponding types of the inorganic substances are compared according to peak positions of the chromatograms, the corresponding ion concentrations of the inorganic substances are calculated according to peak areas, and the mass M2 of the inorganic substance in the electrolyte can be calculated from the mass of the electrolyte.

In S108, the free electrolyte is diluted 3-10 times with acetonitrile to obtain a diluted electrolyte to be tested, the diluted electrolyte is placed in a GC-MS 3100 organic component gas chromatograph for full-scan qualitative analysis at an injection port temperature of 250 °C within a scan range of 35-270 u, the test is completed to obtain total ion flow chromatograms of organic substances, the corresponding types of the organic substances are compared according to peak positions of the chromatograms, the corresponding content percentages of the organic substances are calculated according to peak areas, and the mass of each organic substance can be calculated according to the mass d3-M2 of the organic substance in the electrolyte and the content percentage of the organic substance, for example, the mass d1 of the first solvent and the mass d2 of the additive in the electrolyte can be calculated.

In some embodiments, the secondary battery further includes a positive electrode sheet including a positive electrode current collector and a positive electrode active layer located on at least one surface of the positive electrode current collector, the positive electrode active layer including olivine-structured lithium-containing phosphate. Optionally, the olivine-structured lithium-containing phosphate has a chemical formula of $LiFe_{1-x-y}Mn_xM_yPO_4$, where $0 \leq x \leq 1$, $0 \leq y < 1$, and M is selected from one or more of V, Nb, Ti, Co, Ni, Sc, Ge, Mg, Al, Zr, Mn, Hf, Ta, Mo, W, Ru, Ag, Sn, and Pb.

Optionally, the areal density of the positive electrode active layer is 0.15 $mg/mm^2$ to 0.35 $mg/mm^2$. For example, the areal density of the positive electrode active layer is 0.15 $mg/mm^2$, 0.2 $mg/mm^2$, 0.25 $mg/mm^2$, 0.3 $mg/mm^2$, or 0.35 $mg/mm^2$.

Further optionally, the compacted density of the positive electrode active layer is greater than or equal to 2.4 $g/cm^3$. For example, the compacted density of the positive electrode active layer is 2.4 $g/m^3$ to 2.8 $g/m^3$. Specifically, the compacted density of the positive electrode active layer may be 2.4 g/m$^3$, 2.5 g/m$^3$, 2.6 g/m$^3$, 2.7 g/m$^3$, or 2.8 g/m$^3$.

In some embodiments, the internal gas generation pressure of the secondary battery during cycling is less than or equal to 0.35 MPa.

Further provided in an embodiment of the present application is an electric device. The electric device includes the foregoing secondary battery.

The following appropriately describes the secondary battery and the electric device in this application with reference to the accompanying drawings.

Generally, the secondary battery includes a positive electrode sheet, a negative electrode sheet, an electrolyte, and a separator. During charging and discharging of a battery, active ions are intercalated and deintercalated back and forth between the positive electrode sheet and the negative electrode sheet. The electrolyte functions to conduct ions between the positive electrode sheet and the negative electrode sheet. The separator is disposed between the positive electrode sheet and the negative electrode sheet, to mainly prevent positive and negative electrodes from being short-circuited and allow ions to pass through.

Positive Electrode Sheet

The positive electrode sheet includes a positive electrode current collector and a positive electrode film layer disposed on at least one surface of the positive electrode current collector, the positive electrode film layer including a positive electrode active material.

As an example, the positive electrode current collector has two surfaces opposite in its own thickness direction, and the positive electrode active material is provided on either one or both of the two opposite surfaces of the positive electrode current collector.

In some embodiments, the positive electrode current collector may be a metal foil or a composite current collector. For example, an aluminum foil can be used as the metal foil. The composite current collector may include a polymer material base layer and a metal layer formed on at least one surface of the polymer material base layer. The composite current collector may be formed by forming a metal material on a polymer material substrate. Optionally, the metal material may include, but is not limited to, one or more of aluminum, an aluminum alloy, nickel, a nickel alloy, titanium, a titanium alloy, silver, and a silver alloy. Optionally, the polymer material base layer may include, but is not limited to, one or more of polypropylene (PP), polyethylene terephthalate (PET), polybutylene terephthalate (PBT), polystyrene (PS), and polyethylene (PE).

As an example, the positive electrode active material may include a positive electrode active material well-known in the art for batteries. As an example, the positive electrode active material may include at least one of olivine-structured lithium-containing phosphate, lithium-transition metal oxide, and their respective modifying compounds. However, the present application is not limited to these materials, and other conventional materials that can be used as a positive electrode active material of a battery may also be used. These positive electrode active materials may be used alone or in combination of two or more thereof. Examples of the lithium-transition metal oxide may include, but are not limited to, at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and their respective modified compounds. Optionally, the lithium cobalt oxide includes $LiCoO_2$. The lithium nickel oxide includes $LiNiO_2$. The lithium manganese oxide includes at least one of $LiMnO_2$ and $LiMnO_2O_4$. The lithium nickel cobalt manganese oxide includes at least one of $LiNi_{1/3}Co_{1/3}Mn_{1/3}O_2$ ($NCM_{333}$), $LiNi_{0.5}Co_{0.2}Mn_{0.3}O_2$ ($NCM_{523}$), $LiNi_{0.5}Co_{0.2.5}Mn_{0.25}O_2$ ($NCM_{211}$), $LiNi_{0.6}Co_{0.2}Mn_{0.2}O_2$ ($NCM_{622}$), and $LiNi_{0.8}Co_{0.1}Mn_{0.1}O_2$ ($NCM_{811}$). The lithium nickel cobalt aluminum oxide includes $LiNi_{0.85}Co_{0.15}Al_{0.05}O_2$. Examples of the olivine-structured lithium-containing phosphate may include, but are not limited to, at least one of lithium iron phosphate, a composite material of lithium iron phosphate and carbon, lithium manganese phosphate, a composite material of lithium manganese phosphate and carbon, lithium ferric manganese phosphate, a composite material of lithium ferric manganese phosphate and carbon, and their respective modified compounds. Optionally, the lithium iron phosphate includes $LiFePO_4$ (LFP). The lithium manganese phosphate includes $LiMnPO_4$. The weight ratio of the positive electrode active material in the positive electrode film layer is 80-100 wt % based on the total weight of the positive electrode film layer.

In some embodiments, the positive electrode film layer optionally further includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin. The weight ratio of the binder in the positive electrode film layer is 0-20 wt % based on the total weight of the positive electrode film layer.

In some embodiments, the positive electrode film layer further optionally includes a conductive agent. As an example, the conductive agent may include at least one of superconducting carbon, acetylene black, carbon black, Ketjen black, carbon dots, carbon nanotubes, graphene, and carbon nanofibers. The weight ratio of the conductive agent in the positive electrode film layer is 0-20 wt % based on the total weight of the positive electrode film layer.

In some embodiments, the positive electrode sheet may be prepared by dispersing the above components for preparing a positive electrode sheet, for example, a positive electrode active material, a conductive agent, a binder, and any other components in a solvent to form a positive electrode slurry. Optionally, the solvent includes N-methylpyrrolidone. The solid content of the positive electrode slurry is 40-80 wt %. The viscosity at room temperature is adjusted to 5,000-25,000 MPa·s. The positive electrode slurry is applied onto the surface of the positive electrode current collector, dried, and then cold pressed by a cold rolling mill to form the positive electrode sheet. The coating unit areal density of positive electrode powder is 0.15-0.35 mg/mm$^2$, and the compacted density of the positive electrode sheet is 2.4-3.6 g/cm$^3$. Optionally, when the positive electrode active material is the olivine-structured lithium-containing phosphate, the compacted density is 2.4-2.8 g/cm$^3$, optionally 2.5-2.7 g/cm$^3$. Optionally, when the positive electrode active material is the lithium-transition metal oxide, the compacted density is 3.0-3.6 g/cm$^3$, optionally 3.4-3.6 g/cm$^3$. A calculation formula for the compacted density is as follows: compacted density=coating areal density/(thickness of pressed electrode sheet-thickness of current collector).

Negative Electrode Sheet

The negative electrode sheet includes a negative electrode current collector and a negative electrode film layer disposed on at least one surface of the negative electrode current collector. The negative electrode film layer includes a negative electrode active material.

As an example, the negative electrode current collector has two surfaces opposite in its own thickness direction, and the negative electrode film layer is disposed on either one or both of the two opposite surfaces of the negative electrode current collector.

In some embodiments, the negative electrode current collector may be a metal foil or a composite current collector. For example, a copper foil may be used as the metal foil. The composite current collector may include a polymer material base layer and a metal layer formed on at least one surface of a polymer material substrate. The composite current collector may be formed by forming a metal material on a polymer material substrate. Optionally, the metal material includes at least one of copper, a copper alloy, nickel, a nickel alloy, titanium, a titanium alloy, silver, and a silver alloy. The polymer material includes at least one of polypropylene (PP), polyethylene terephthalate (PET), polybutylene terephthalate (PBT), polystyrene (PS), and polyethylene (PE).

In some embodiments, the negative electrode active material may be a negative electrode active material well-known in the art for batteries. As an example, the negative electrode active material may include at least one of the following materials: synthetic graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, this application is not limited to these materials, and another conventional material that can be used as a negative electrode active material of a battery may also be used. These negative electrode active materials may be used alone or in combination of two or more thereof. The weight ratio of the negative electrode active material in the negative electrode film layer is 70-100 wt % based on the total weight of the negative electrode film layer.

In some embodiments, the negative electrode film layer optionally further includes a binder. The binder may be selected from at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS). The weight ratio of the binder in the negative electrode film layer is 0-30 wt % based on the total weight of the negative electrode film layer.

In some embodiments, the negative electrode film layer further optionally includes a conductive agent. The conductive agent may be selected from at least one of superconducting carbon, acetylene black, carbon black, Ketjen black, carbon dots, carbon nanotubes, graphene, and carbon nanofibers. The weight ratio of the conductive agent in the negative electrode film layer is 0-20 wt % based on the total weight of the negative electrode film layer.

In some embodiments, the negative electrode film layer further optionally includes another auxiliary agent, for example, a thickening agent. The weight ratio of the another auxiliary agent in the negative electrode film layer is 0-15 wt % based on the total weight of the negative electrode film layer. Optionally, the thickening agent includes sodium carboxymethylcellulose (CMC-Na).

In some embodiments, the negative electrode sheet may be prepared by dispersing the above components for preparing a negative electrode sheet, for example, a negative electrode active material, a conductive agent, a binder, and any other components in a solvent to form a negative electrode slurry. Optionally, the solvent includes deionized water. The solid content of the negative electrode slurry is 30-70 wt %. The viscosity at room temperature is adjusted to 2,000-10,000 MPa·s. The obtained negative electrode slurry is applied onto the negative electrode current collector and is subjected to a drying process, followed by cold pressing, for example, double rolling, to obtain the negative electrode sheet. The coating unit areal density of negative electrode powder is 0.09-0.16 $mg/mm^2$. The compacted density of the negative electrode sheet is 1.5-1.8 $g/m^3$.

Electrolyte

The electrolyte functions to conduct ions between the positive electrode sheet and the negative electrode sheet. The type of the electrolyte is not specifically limited in this application, and may be selected according to a requirement. For example, the electrolyte may be liquid, gelled or all solid.

In some embodiments, the electrolyte is an electrolyte. The electrolyte includes an electrolyte salt and a solvent.

As an example, the electrolyte salt may be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis-trifluoromethanesulfonimide (LiTFSI), lithium trifluoromethanesulfonate (LiTFS), lithium difluoro (oxalato) borate (LiDFOB), lithium dioxalate borate (LiBOB), lithium difluorophosphate ($LiPO_2F_2$), lithium difluorodioxalate phosphate (LiDFOP), and lithium tetrafluorooxalate phosphate (LiTFOP). The concentration of the electrolyte salt is usually 0.5-5 mol/L.

In some embodiments, the solvent may be selected from one or more of fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), and ethyl sulfonyl ethane (ESE).

In some embodiments, the electrolyte further optionally includes an additive. For example, the additive may include a negative electrode film-forming additive or a positive electrode film-forming additive, and may further include an additive capable of improving specific performance of a battery, for example, an additive for improving overcharge performance of a battery, or an additive for improving high-temperature or low-temperature performance of a battery.

Separator

In some embodiments, the secondary battery further includes a separator. The type of the separator is not particularly limited in this application, and any well-known porous separator with good chemical stability and mechanical stability may be used.

In some embodiments, a material of the separator may be selected from at least one of glass fibers, nonwoven fabrics, polyethylene, polypropylene, and polyvinylidene fluoride. The separator may be a single-layer thin film or may be a multi-layer composite thin film, which is not particularly limited. When the separator is a multi-layer composite thin film, materials of each layer may be the same or different, which is not particularly limited.

In some embodiments, the positive electrode sheet, the negative electrode sheet, and the separator may be manufactured into the electrode assembly through a winding process or a lamination process.

In some embodiments, the secondary battery may include an outer package. The outer package may be used to package the electrode assembly and the electrolyte.

In some embodiments, the outer package of the secondary battery may be a hard case, such as a hard plastic case, an aluminum case, a steel case, or the like. The outer package of the secondary battery may also be a pouch, such as a bag-type pouch. The material of the pouch may be plastic, and examples of the plastic include polypropylene, polybutylene terephthalate, and polybutylene succinate. The shape of the secondary battery is not limited in this application, and may be a cylindrical shape, a square shape, or any other shape. For example, FIG. 1 shows a secondary battery 1 of a square structure as an example.

Figure 2:
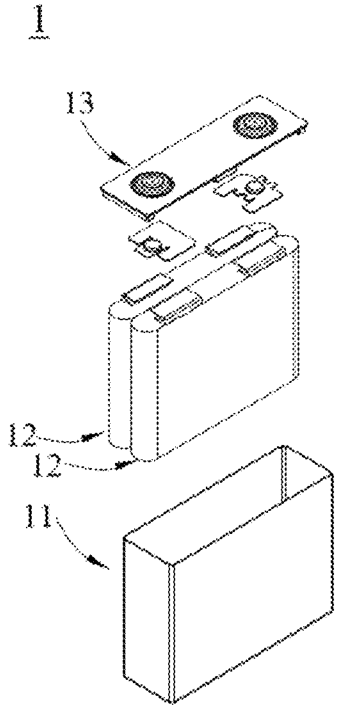
FIG. 2 is an exploded view of the secondary battery according to the embodiment of the present application shown in FIG. 1.

In some embodiments, referring to FIG. 2, the outer package may include a housing 11 and a cover plate 13. The housing 11 may include a bottom plate and side plates connected to the bottom plate, where the bottom plate and the side plates define an accommodating chamber. The housing 11 has an opening communicating with the accommodating chamber, and the cover plate 13 can cover the opening to close the accommodating chamber. The positive electrode sheet, the negative electrode sheet, and the separator may be formed into an electrode assembly 12 through a winding process or a lamination process. The electrode assembly 12 is enclosed within the accommodation chamber. The electrolyte is impregnated into the electrode assembly 12. There may be one or a plurality of electrode assemblies 12 included in the secondary battery 1, and the number may be selected by those skilled in the art according to specific practical requirements.

In addition, the present application further provides an electric device, including the secondary battery provided in the present application. The secondary battery may be used as a power supply for the electric device, or as an energy storage unit for the electric device. The electric device may include a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, a ship, a satellite, an energy storage system, and the like, but is not limited thereto.

The secondary battery may be selected according to use requirements of the electric device.

Figure 3:
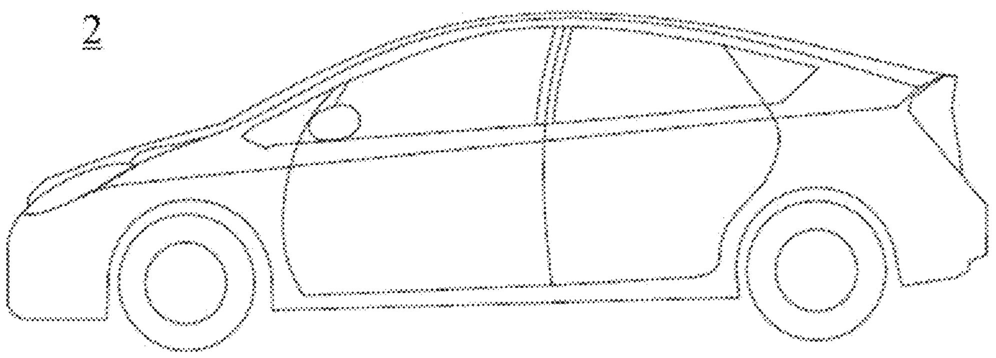
FIG. 3 is a schematic diagram of an electric device using a secondary battery as a power supply according to an embodiment of the present application.

FIG. 3 shows an electric device 2 as an example. The electric device is a pure electric vehicle, a hybrid electric vehicle, a plug-in hybrid electric vehicle, or the like. In order to meet the demand for high power and high energy density of the secondary battery by the electric device, a battery pack or a battery module may be used.

In another example, the apparatus may be a cell phone, a tablet computer, a notebook computer, or the like. This electric device is generally required to be thin and lightweight, and may use a secondary battery as a power supply.

EXAMPLES

In order to make the technical problems solved by the present application, the technical solutions, and the beneficial effects clearer, the present application will be further described in detail below with reference to the embodiments and the accompanying drawings. Apparently, the described embodiments are only a part of the embodiments of the present application, and not all of the embodiments. The following description of at least one exemplary embodiment is merely illustrative in nature and is in no way intended as any limitation on the application and its applications. All other embodiments obtained by those of ordinary skill in the art based on the embodiments of the present application without making creative efforts shall fall within the protection scope of the present application.

In the embodiments, specific techniques or conditions are not indicated, and they are performed according to techniques or conditions described in documents in the art or according to the specification of the product. The reagents or instruments used without specifying the manufacturer(s) are conventional products that are commercially available.

Example 1

Preparation of a Positive Electrode Sheet

Lithium iron phosphate as a positive electrode active material, polyvinylidene fluoride as a binder, and acetylene black as a conductive agent were mixed at 97:2:1, and then N-methylpyrrolidone (NMP) as a solvent was added and stirred to obtain a positive electrode slurry. The positive electrode slurry was uniformly applied onto a positive electrode current collector, dried, and cold pressed to obtain the positive electrode sheet. The areal density of the positive electrode active layer of the positive electrode sheet is 0.27 $mg/mm^2$. The compacted density of the positive electrode active layer is to 2.55 $g/cm^3$.

Preparation of a Negative Electrode Sheet

Graphite as a negative electrode active material, acetylene black as a conductive agent, styrene-butadiene rubber as a binder, and sodium carboxymethyl cellulose as a thickening agent were mixed at the mass ratio of 96:1:2:1, and then deionized water as a solvent was added and stirred to obtain a negative electrode slurry. The negative electrode slurry was uniformly applied onto a copper foil as a negative electrode current collector, dried, and cold pressed to obtain the negative electrode sheet. The areal density of the negative electrode active layer of the negative electrode sheet is 0.12 $mg/mm^2$. The compacted density of the negative electrode active layer is 1.6 $g/cm^3$. The porosity of the negative electrode active layer is 30%.

Preparation of an Electrolyte

In a glove box in an argon atmosphere with water content of <10 ppm, ethyl acetate (EA), ethylene carbonate (EC), and ethyl methyl carbonate (EMC) were uniformly mixed at the mass ratio of 20:30:50 to obtain an electrolyte solvent. 15% by mass of lithium hexafluorophosphate ($LiPF_6$) as a lithium salt was slowly added and fully stirred until it was completely dissolved. After the temperature restores to normal temperature, 3% by mass of vinylene carbonate, 1% by mass of fluoroethylene carbonate, 0.5% by mass of 1,3-propene sultone, 0.5% by mass of ethylene sulfite, and 1% by mass of lithium difluorobis(oxalato) phosphate were added in sequence and mixed fully and uniformly to obtain the electrolyte.

Preparation of a Separator

A polyethylene (PE) film coated with a nano alumina coating was used as the separator.

Preparation of a Secondary Battery

The positive electrode sheet, the separator, and the negative electrode sheet were stacked in sequence and wound to obtain a wound electrode assembly. The electrode assembly was placed in a square aluminum case of an outer package, dried and then injected with the electrolyte. The secondary battery is obtained through processes such as packaging, standing, formation, aging, secondary packaging, and capacity. A liquid retention coefficient d3/A of the secondary battery is 3.0 g/Ah.

Example 2 to Example 15

Compared with Example 1, Example 2 to Example 15 differ as shown in Table 1.

Comparative Example 1 to Comparative Example 3

Compared with Example 1, Comparative Example 1 to Comparative Example 3 differ as shown in Table 1.

The types of additives in Examples and Comparative Examples are the same, except that the mass percentages of some of the materials are different, as shown in Table 1.

Test Example

The secondary batteries in Examples and Comparative Examples were subjected to a fast-charging time test, a number-of-cycle test, and an internal gas generation pressure test, respectively. Test results are as shown in Table 1.

(1) A fast-charging test method is a laminated three-electrode test method in which the positive and negative electrode sheets of the hard-cased battery cell are taken out and washed by immersion in the DMC solvent for 72 hours or more; when the electrolyte solvent, the lithium salt, and the additive are completely leached out, the electrode sheets are dried in a vacuum oven; and then the positive and negative electrode sheets are assembled into a laminated three-electrode battery cell, with a copper wire as a reference electrode. Then, the laminated three-electrode battery cell is tested for the lithium precipitation charging rate at each SOC at 25 °C. The maximum charging rate is terminated when the potential of the reference electrode drops to 0 mV, and the maximum charging rate at this SOC is recorded. According to this method, 5% SOC is used as a point, the maximum charging rate is tested at 5% SOC intervals, from 5% SOC, 10% SOC, 15% SOC up to 100% SOC, and the continuous charging time from 10% SOC to 80% SOC is calculated according to the maximum charging rate within the range of 10% SOC to 80% SOC obtained by this test, which is the fast-charging time.

(2) A number-of-cycle test method is as follows: charging to 3.65 V at a charging rate of 0.5 C for the nominal capacity of the battery at 25 °C; then charging to 0.05 C at a constant voltage of 3.65 V, and standing for 10 min; then discharging to 2.5 V at a discharging rate of IC, and standing for 10 min, where the above single charging and discharging process is one cycle; and stopping the test until the capacity of the battery decays to 80% of the nominal capacity, which is recorded as the number of cycle @80% SOH.

(3) An internal gas generation pressure test method is as follows: connecting the battery cell after the cycle to a gas pressure gauge by using a needle tube with a diameter of 1-10 mm before the jig is disassembled, inserting the needle tube into the battery cell from the explosion-proof valve of the battery cell, and observing the value displayed on the gas pressure gauge, which is the internal gas generation pressure of the battery cell.

TABLE 1

| No. | Negative electrode sheet Graphite active layer: Areal density CW | Compacted density Cd | Porosity P | Electrolyte: First solvent: Type | Reduction potential | Mass percentage | Additive: Type | Reduction potential |
|---|---|---|---|---|---|---|---|---|
| Example 1 | 0.12 | 1.6 | 30 | $C_4H_8O_2$ | 1.3 | 20% | Vinylene carbonate | 1.2 |
| Example 2 | 0.12 | 1.6 | 30 | $C_4H_8O_2$ | 1.3 | 20% | Vinylene carbonate | 1.2 |
| Example 3 | 0.12 | 1.6 | 30 | $C_4H_8O_2$ | 1.3 | 20% | Vinylene carbonate | 1.2 |
| Example 4 | 0.12 | 1.6 | 30 | $C_4H_8O_2$ | 1.3 | 50% | Vinylene carbonate | 1.2 |
| Example 5 | 0.12 | 1.6 | 30 | $C_4H_8O_2$ | 1.3 | 50% | Vinylene carbonate | 1.2 |
| Example 6 | 0.12 | 1.6 | 30 | $C_4H_8O_2$ | 1.3 | 50% | Vinylene carbonate | 1.2 |
| Example 7 | 0.12 | 1.6 | 30 | $C_4H_8O_2$ | 1.3 | 20% | Vinylene carbonate | 1.2 |
| Example 8 | 0.12 | 1.6 | 30 | $C_4H_8O_2$ | 1.3 | 20% | Vinylene carbonate | 1.2 |
| Example 9 | 0.12 | 1.6 | 30 | $C_4H_8O_2$ | 1.3 | 50% | Vinylene carbonate | 1.2 |
| Example 10 | 0.12 | 1.6 | 30 | $C_4H_8O_2$ | 1.3 | 50% | Vinylene carbonate | 1.2 |
| Example 11 | 0.12 | 1.6 | 30 | $C_4H_8O_2$ | 1.3 | 5% | Vinylene carbonate | 1.2 |
| Example 12 | 0.16 | 1.6 | 30 | $C_4H_8O_2$ | 1.3 | 20% | Vinylene carbonate | 1.2 |
| Example 13 | 0.12 | 1.6 | 30 | $C_4H_7FO_2$ | 1.23 | 20% | Vinylene carbonate | 1.2 |
| Example 14 | 0.12 | 1.6 | 30 | $C_4H_8O_2$ | 1.3 | 20% | Fluoroethylene carbonate | 1.5 |

TABLE 1-continued

| | | | | | | | | |
|---|---|---|---|---|---|---|---|---|
| Example 15 | 0.12 | 1.6 | 30 | $C_4H_8O_2$ | 1.3 | 20% | 1,3-propene sultone | 1.2 |
| Comparative example 1 | 0.18 | 1.6 | 30 | $C_4H_8O_2$ | 1.3 | 20% | Vinylene carbonate | 1.2 |
| Comparative example 2 | 0.12 | 1.6 | 30 | $C_4H_8O_2$ | 1.3 | 60% | Vinylene carbonate | 1.2 |

| | Electrolyte | | Secondary battery | | | | |
|---|---|---|---|---|---|---|---|
| No. | Additive Mass percentage | Lithium ion conductivity | d2/d1 | (d2/d1)/(CW × P/Cd) | Fast-charging time | Number of Cycle | Internal gas generation pressure |
| Example 1 | 3% | 15.8 | 0.15 | 6.67 | 25 | 1500 | 0.2 |
| Example 2 | 5% | 15.5 | 0.25 | 11.11 | 25.5 | 1900 | 0.18 |
| Example 3 | 7% | 15.2 | 0.35 | 15.56 | 26 | 2300 | 0.16 |
| Example 4 | 3% | 19.4 | 0.06 | 2.67 | 19 | 1200 | 0.25 |
| Example 5 | 5% | 19.1 | 0.1 | 4.44 | 19.5 | 1600 | 0.23 |
| Example 6 | 7% | 18.8 | 0.14 | 6.22 | 20 | 2000 | 0.2 |
| Example 7 | 1% | 16 | 0.05 | 2.22 | 24 | 925 | 0.5 |
| Example 8 | 12% | 14 | 0.6 | 26.67 | 30 | 2600 | 0.14 |
| Example 9 | 1% | 19.6 | 0.02 | 0.89 | 19 | 513 | 0.5 |
| Example 10 | 12% | 18.2 | 0.24 | 10.67 | 21 | 2400 | 0.18 |
| Example 11 | 3% | 12.4 | 0.6 | 26.67 | 35 | 1800 | 0.17 |
| Example 12 | 3% | 15.8 | 0.15 | 5.00 | 33 | 1321 | 0.23 |
| Example 13 | 3% | 15.2 | 0.15 | 6.67 | 26 | 1580 | 0.193 |
| Example 14 | 3% | 15.8 | 0.15 | 6.67 | 25 | 1356 | 0.22 |
| Example 15 | 3% | 15.7 | 0.15 | 6.67 | 25 | 1228 | 0.23 |
| Comparative example 1 | 1% | 16 | 0.05 | 1.48 | 38 | 903 | 0.5 |
| Comparative example 2 | 3% | 20.8 | 0.05 | 2.22 | 17 | 407 | 0.5 |

It can be understood that, in Table 1, the unit of the areal density CW is $mg/mm^2$. The unit of the compacted density Cd is $g/cm^3$. The unit of the porosity P is %. The unit of the reduction potential is V. The unit of the lithium ion conductivity is mS/cm. The unit of the fast-charging time is min. The unit of the number of cycle is cycle. The unit of the internal gas generation pressure is MPa.

It may also be understood that, in Table 1, the mass percentage of the first solvent represents the mass percentage of the first solvent in the electrolyte. The mass percentage of the additive represents the mass percentage of the material in the corresponding column of "type" of the additive in the electrolyte. The first solvent $C_4H_8O_2$ represents ethyl acetate, and $C_4H_7FO_2$ represents ethyl fluoroacetate.

As can be seen from Table 1, when the areal density of the negative electrode active layer is less than or equal to 0.16 $mg/mm^2$ and the lithium ion conductivity of the electrolyte is less than or equal to 20 mS/cm, the battery can achieve both good cycle performance and good fast-charging performance.

The technical features of the above-mentioned example may be combined, and all possible combinations of the technical features in the above-mentioned embodiments are not described for concise description, however, it should be regarded that the combinations of the technical features are with the range described in the present description as long as there is no inconsistency.

The above examples merely illustrate several embodiments of the present application, which are described specifically and in detail, but are not to be construed as limiting the scope of the disclosure. It should be noted that, for those skilled in the art, several variations and modifications may be made without departing from the concept of the present application, which are all within the protection scope of the present application. Therefore, the scope of patent protection of this application shall be subject to the appended claims.

What is claimed is:

1. A secondary battery, comprising a negative electrode sheet and an electrolyte, wherein:

the negative electrode sheet comprises a negative electrode current collector and a negative electrode active layer located on at least one surface of the negative electrode current collector, the negative electrode active layer comprises graphite, an areal density CW of the negative electrode active layer is 0.12 $mg/mm^2$ to 0.14 $mg/mm^2$, a porosity P of the negative electrode active layer is 20% to 40%, and a compacted density Cd of the negative electrode active layer is 1.5 $g/cm^3$ to 1.8 $g/cm^3$;

a lithium ion conductivity of the electrolyte at 25 °C is 15 mS/cm to 19 mS/cm;

the electrolyte comprises a first solvent and an additive, the first solvent having a general structural formula of R1-COO-R2, wherein R1 and R2 are each independently selected from any one of C1-C5 alkyl and C1-C5 haloalkyl, at least one of R1 or R2 is C1-C5 haloalkyl, a mass percentage of the first solvent in the electrolyte is 20% to 50%, and at least a part of the additive reacts prior to the first solvent at a time of forming a solid electrolyte interface (SEI) film on the negative electrode active layer; and the secondary battery satisfies: 2 g/Ah≤d3/A≤3.3 g/Ah, wherein d3 represents a mass of the electrolyte in g, A represents a rated capacity of the secondary battery in Ah.

2. The secondary battery according to claim 1, wherein the first solvent comprises at least one of the following compounds:

(9)

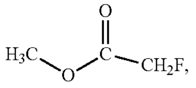

(10)

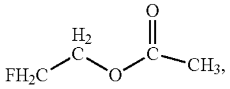

(11)

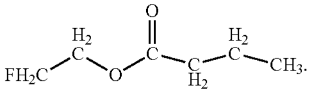

3. The secondary battery according to claim 1, wherein the additive satisfies at least one of the following features:

(1) a reduction potential of the additive with respect to $Li/Li^+$ is 0.9 V to 1.7 V;

(2) the additive comprises one or more of vinylene carbonate, fluoroethylene carbonate, vinylethylene carbonate, vinyl sulfate, vinyl sulfite, 1,3-propane sultone, and 1,3-propene sultone; and (3) a mass percentage of the additive in the electrolyte is 2% to 10%, optionally 3% to 8%.

4. The secondary battery according to claim 1, wherein a mass d1 of the first solvent and a mass d2 of the additive satisfy:

0.05≤d2/d1 ≤1, optionally 0.05≤d2/d1 ≤0.6, optionally 0.05≤d2/d1 ≤0.4.

5. The secondary battery according to claim 1, wherein a mass d1 of the first solvent, a mass d2 of the additive, and a rated capacity A of the secondary battery satisfy:

0.1 g/Ah≤(d1+d2)/A≤2.3 g/Ah, optionally 0.5 g/Ah≤(d1+d2)/A≤2.2 g/Ah.

6. The secondary battery according to claim 1, wherein the graphite is artificial graphite, and a mass d1 of the first solvent, a mass d2 of the additive, and a rated capacity A of the secondary battery satisfy:

0.05≤d2/d1 ≤0.5, optionally 0.05≤d2/d1 ≤0.35; and/or 0.4 g/Ah≤(d1+d2)/A≤2.3 g/Ah, optionally 0.7 g/Ah≤(d1+d2)/A≤2.0 g/Ah.

7. The secondary battery according to claim 1, wherein the graphite comprises natural graphite, and a mass d1 of the first solvent, a mass d2 of the additive, and a rated capacity A of the secondary battery satisfy:

0.1≤d2/d1 ≤1, optionally 0.1≤d2/d1 ≤0.35; and/or 0.1 g/Ah≤(d1+d2)/A≤1.5 g/Ah, optionally 0.5 g/Ah≤(d1+d2)/A≤1.5 g/Ah.

8. The secondary battery according to claim 1, wherein the porosity P of the negative electrode active layer satisfies 25%≤P≤40%.

9. The secondary battery according to claim 1, wherein the electrolyte comprises a second solvent comprising at least one of cyclic carbonate and linear carbonate; and optionally, a mass percentage of the second solvent in the electrolyte is 30% to 85%.

10. The secondary battery according to claim 1, wherein the secondary battery further comprises a positive electrode sheet comprising a positive electrode current collector and a positive electrode active layer located on at least one surface of the positive electrode current collector, the positive electrode active layer comprising olivine-structured lithium-containing phosphate; and optionally, the olivine-structured lithium-containing phosphate has a chemical formula of $LiFe_{1-x-y}Mn_xM_yPO_4$, wherein 0≤x≤1, 0≤y<1, and M is selected from one or more of V, Nb, Ti, Co, Ni, Sc, Ge, Mg, Al, Zr, Mn, Hf, Ta, Mo, W, Ru, Ag, Sn, and Pb.

11. An electric device, comprising the secondary battery according to claim 1.

12. A secondary battery, comprising a negative electrode sheet and an electrolyte, wherein:

the negative electrode sheet comprises a negative electrode current collector and a negative electrode active layer located on at least one surface of the negative electrode current collector, the negative electrode active layer comprises graphite, an areal density CW of the negative electrode active layer is 0.12 $mg/mm^2$ to 0.14 $mg/mm^2$, a porosity P of the negative electrode active layer is 20% to 40%, and a compacted density Cd of the negative electrode active layer is 1.5 $g/cm^3$ to 1.8 $g/cm^3$, a lithium ion conductivity of the electrolyte at 25 °C is 15 mS/cm to 19 mS/cm;

the electrolyte comprises a first solvent and an additive, the additive comprising vinyl sulfite, the first solvent having a general structural formula of R1-COO-R2, wherein R1 and R2 are each independently selected from any one of C1-C5 alkyl and C1-C5 haloalkyl, a mass percentage of the first solvent in the electrolyte is 20% to 50%, and at least a part of the additive reacts prior to the first solvent at a time of forming a solid electrolyte interface (SEI) film on the negative electrode active layer; and the secondary battery satisfies: 2 g/Ah≤d3/A≤3.3 g/Ah, wherein d3 represents a mass of the electrolyte in g, A represents a rated capacity of the secondary battery in Ah.

* * * * *